United States Patent
Harrison

[11] 3,762,508
[45] Oct. 2, 1973

[54] SELF-SERVO BRAKING SYSTEMS
[75] Inventor: Anthony William Harrison, Birmingham, England
[73] Assignee: Girling Limited, Birmingham, England
[22] Filed: July 1, 1971
[21] Appl. No.: 158,970

[30] Foreign Application Priority Data
July 4, 1970 Great Britain............. 32,528/70
Mar. 10, 1971 Great Britain............. 6,444/71

[52] U.S. Cl. .................. 188/70 B, 188/342
[51] Int. Cl. ........................... F16d 63/00
[58] Field of Search .......... 188/70 R, 70 B, 342, 188/343

[56] References Cited
UNITED STATES PATENTS
2,915,145  12/1959  Mossey................ 188/70 B
2,968,367  1/1961   Burnett............... 188/70 B
3,139,955  7/1964   Dombeck.............. 188/70 B Primary Examiner—Duane A. Reger
Attorney—Scrivener, Parker, Scrivener & Clark

[57] ABSTRACT

In a self-servo braking system comprising two pairs of friction elements one element is common to both pairs or one element of one pair carries an element of the other pair and the elements of one pair are brought into engagement by the drag force on said one element when the elements of the second pair are brought into engagement by a control force.

9 Claims, 12 Drawing Figures

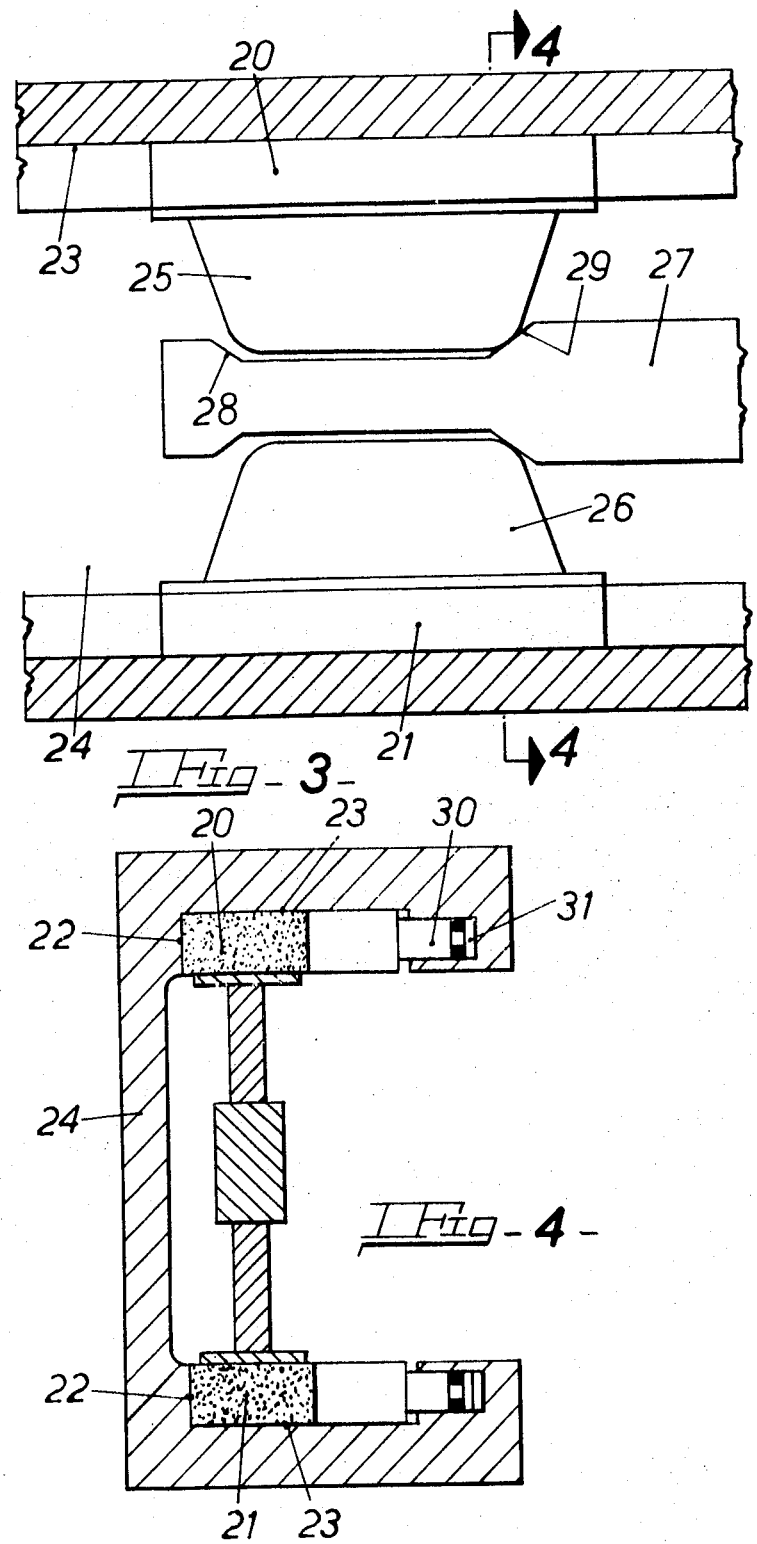

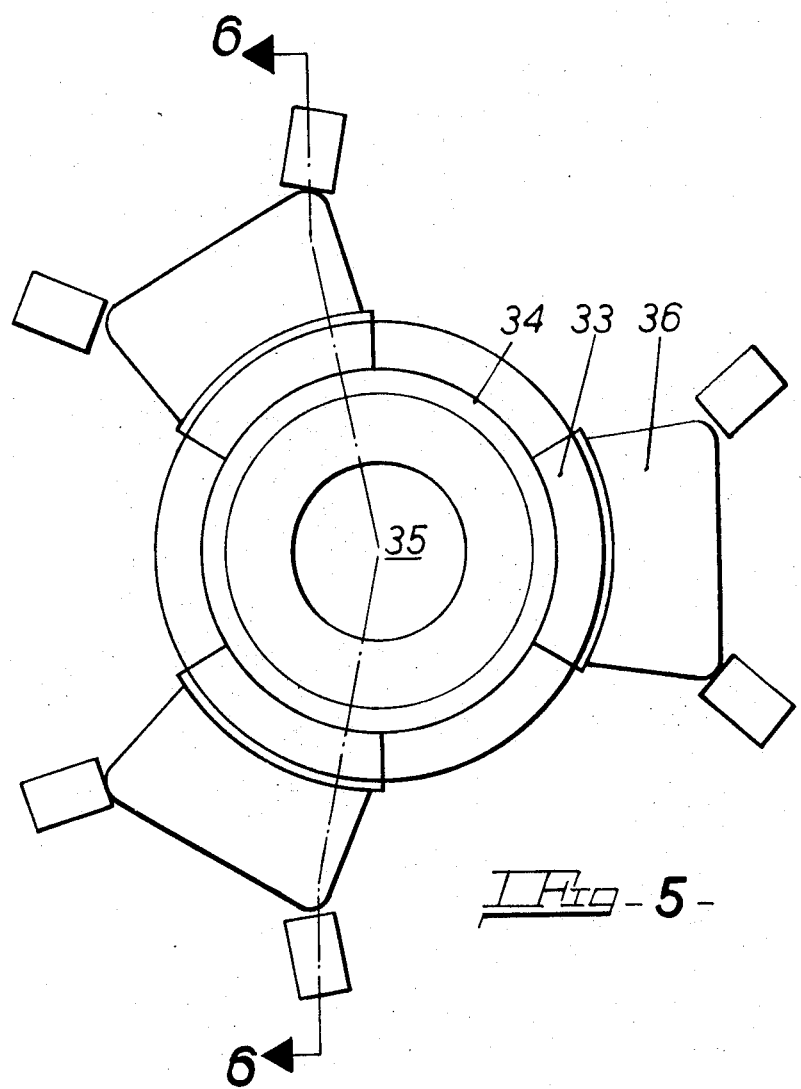

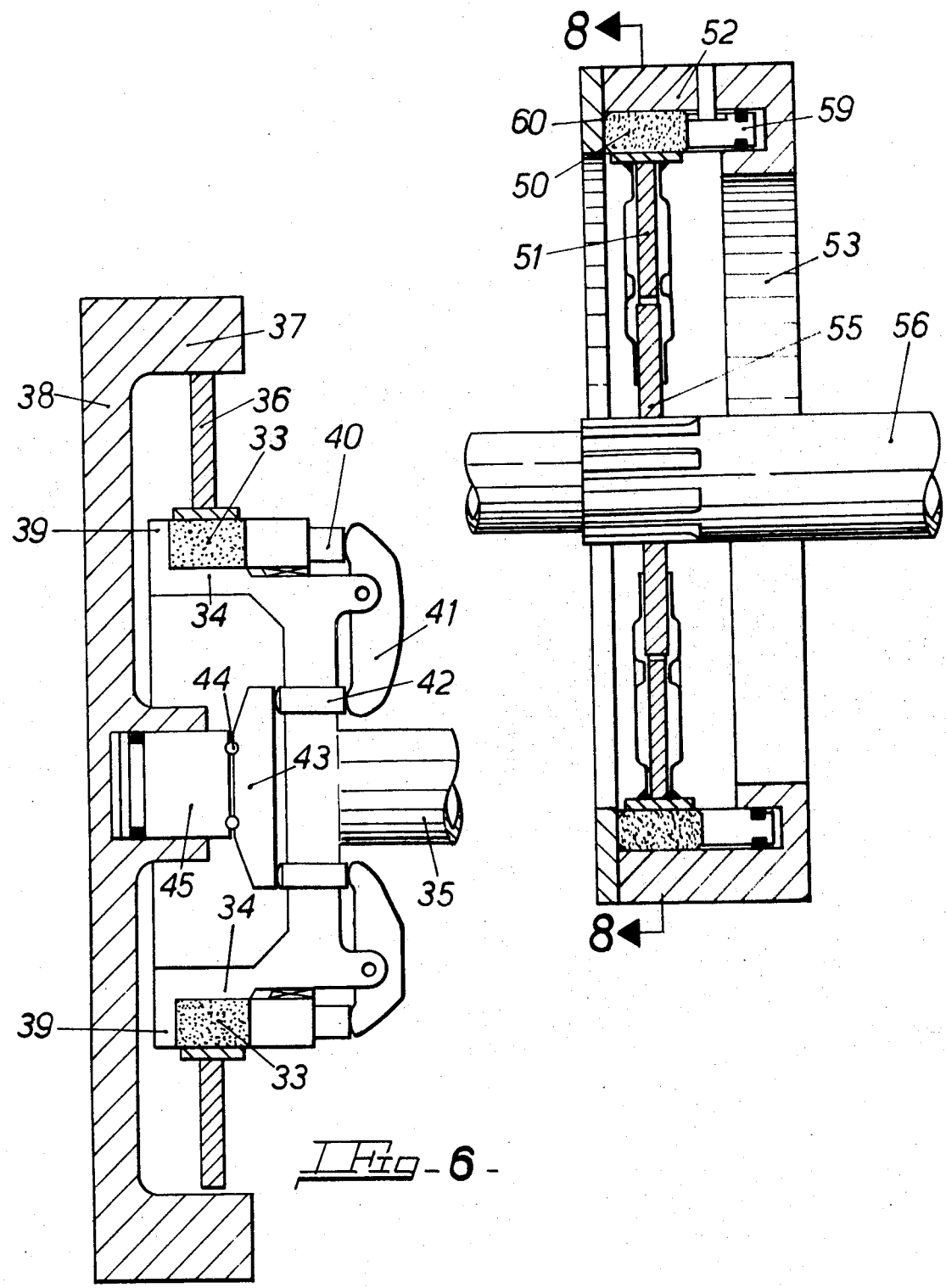

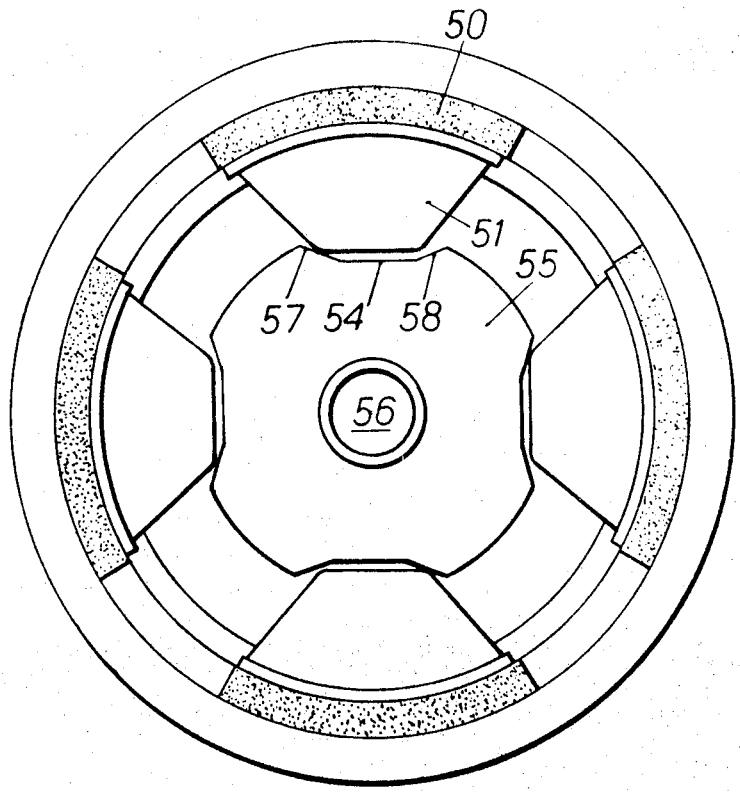
Fig-8-
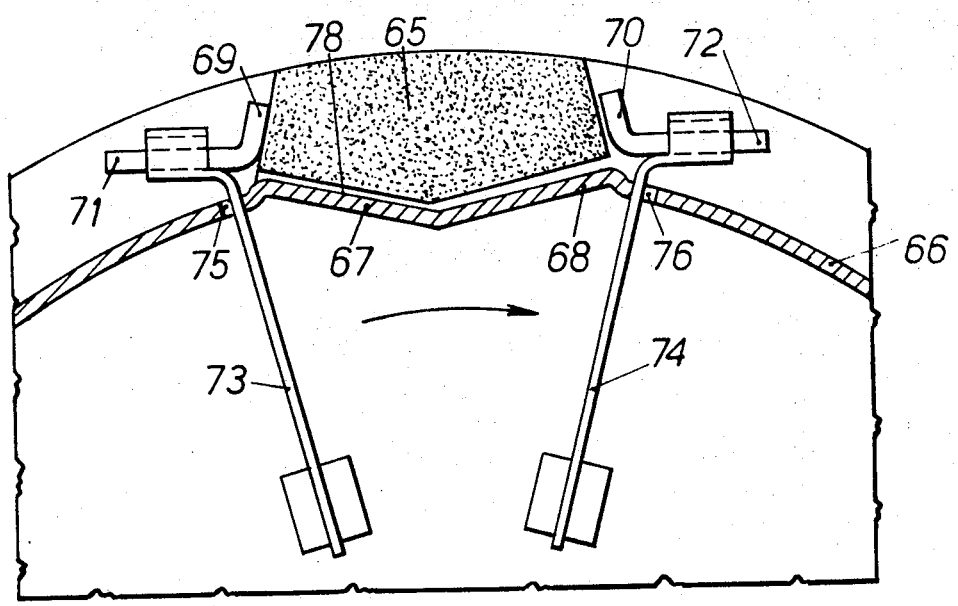
Fig-10-

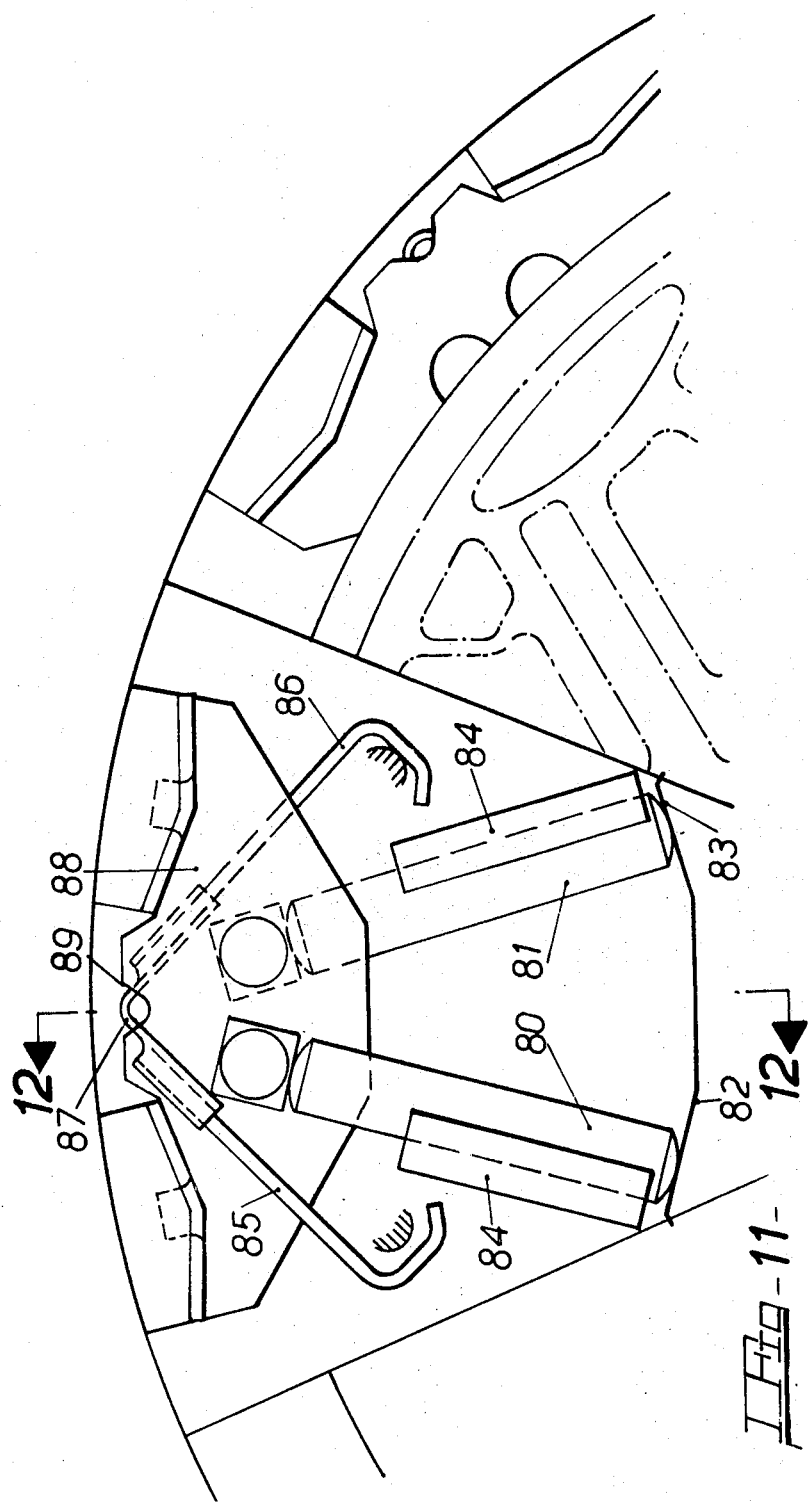

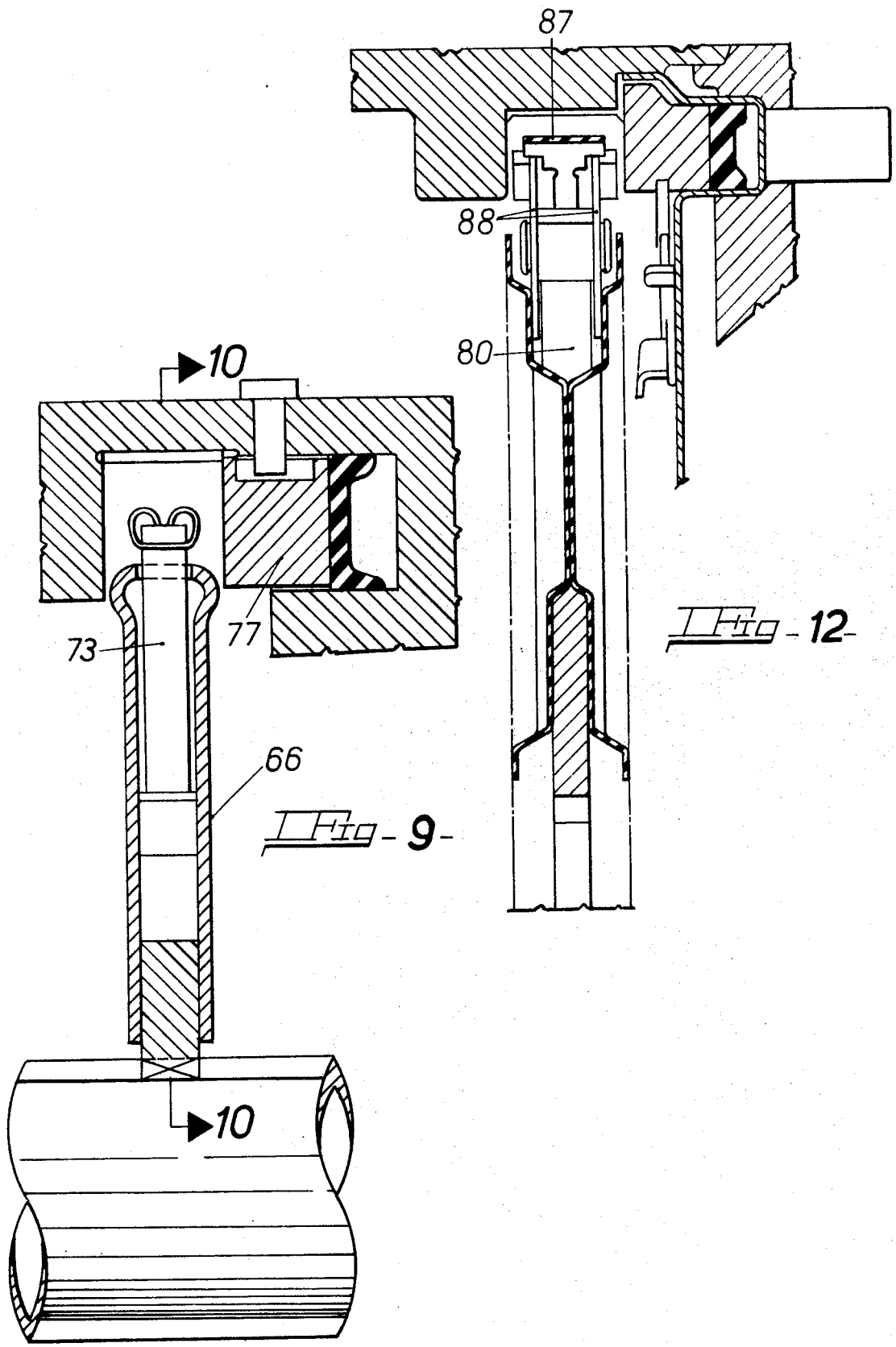

SELF-SERVO BRAKING SYSTEMS

This invention relates to improvements in self-servo braking systems primarily to such systems for braking a rotating member.

In friction braking systems it is well known to react the drag force on the friction elements in such a way as to contribute to the clamping force at the friction interface. Such systems are said to have positive servo. When the drag force reduces the clamping force at the interface the system is said to have negative servo. Positive servo systems increase the braking effect but introduce instability, i.e., a condition where a given change in friction coefficient causes an increased variation in the braking effect. Negative servo systems improve stability but reduce the braking effect for a given control force.

Braking systems are also known in which the main braking effort is provided by a first pair of friction elements which are pressed together by the frictional force resulting from a second pair of friction elements which in turn are actuated by a control system.

Such systems are prone to vibration in the linkage connecting the second pair of friction elements to the first pair of friction elements if the mechanical advantage of the linkage is increased to give a large main braking force for a small control force. This vibration arises in a complex manner, probably due to the interaction of the following effects, (a) inertia effects, (b) deflections, (c) rising friction coefficient with reducing sliding velocity.

It is the aim of the invention to provide a stable braking system in which a control force produces a larger braking force without undue vibration.

According to our invention, in a self-servo braking system comprising two pairs of friction elements one element is common to both pairs or one element of one pair carries an element of the other pair and the elements of one pair are brought into engagement by the drag force on the said one element when the elements of the second pair are brought into engagement by a control force.

In one embodiment a self-servo brake for a rotating member comprises a carrier member rotatable with the rotating member, a first pair of friction elements for providing the main braking effort, one element being on the carrier member and the other being stationary, and a second pair of elements subject to a control force, one element of the second pair being stationary and the other being on means mounted on the carrier for transmitting the drag force experienced by the second pair of friction elements to the first pair, the second pair of friction elements operating at a smaller effective radius from the axis of the rotating member than the first pair.

By placing the second friction pair at a substantially smaller radius than the first friction pair, the friction torque produced by the first friction pair is increased without the need for a large mechanical advantage between the output from the second pair and the input to the first pair.

The control force actuating the second friction pair may be applied by alternative methods to provide service braking and a parking brake.

Preferably the force transmitting system is such that the first friction pair is engaged irrespective of the direction of rotation of the rotating member.

Preferably the first friction pair is mounted so that the drag force does not increase the clamping force at the interface, i.e., mounted for negative servo or non-servo. By this means the system is made less liable to noise and instability in use in spite of the large energy dissipation and consequent large temperature rise. The second friction pair may be arranged to have positive servo since the small energy dissipation produces only a small temperature rise and therefore only a small change in the friction coefficient. Also the second friction pair may be arranged to have zero or an absolute minimum of running clearance so that the control movement is kept to a minimum.

In another embodiment a servo brake incorporates primary and secondary pairs of co-operating braking elements the friction surfaces of the elements of one pair being inclined with respect to those of the other pair and one element being common to both pairs and frictional engagement of the elements of the primary pair produces movement of the common element relative to an abutment or abutments.

The co-operating friction surfaces of the two pairs of elements are preferably substantially at right angles to each other, the common element having two friction surfaces at right angles to each other.

The relative movement to be retarded by the brake may be linear but will usually be rotational.

The abutment on abutments may be on a carrier which rotates relative to a stationary member or on a stationary member adapted to co-operate with braking elements on a rotatable member.

Some embodiments of our invention are illustrated by way of example in the accompanying drawings in which;

FIG. 3 is a diagrammatic longitudinal section of a system in which the relative movement is linear;

FIG. 4 is a transverse section on the line 4—4 of FIG. 1;

FIG. 5 is a diagrammatic end view of a rotational system;

FIG. 6 is a section on the line 6—6 of FIG. 5;

FIG. 7 is a diagrammatic section of another system;

FIG. 8 is a section on the line 8—8 of FIG. 7;

FIG. 9 is a fragmentary radial section of another system;

FIG. 10 is a section on the line 10—10 of FIG. 9;

FIG. 11 is a fragmentary end view of a portion of a still further system; and

FIG. 12 is a section on the line 12—12 of FIG. 11.

Figure 1:
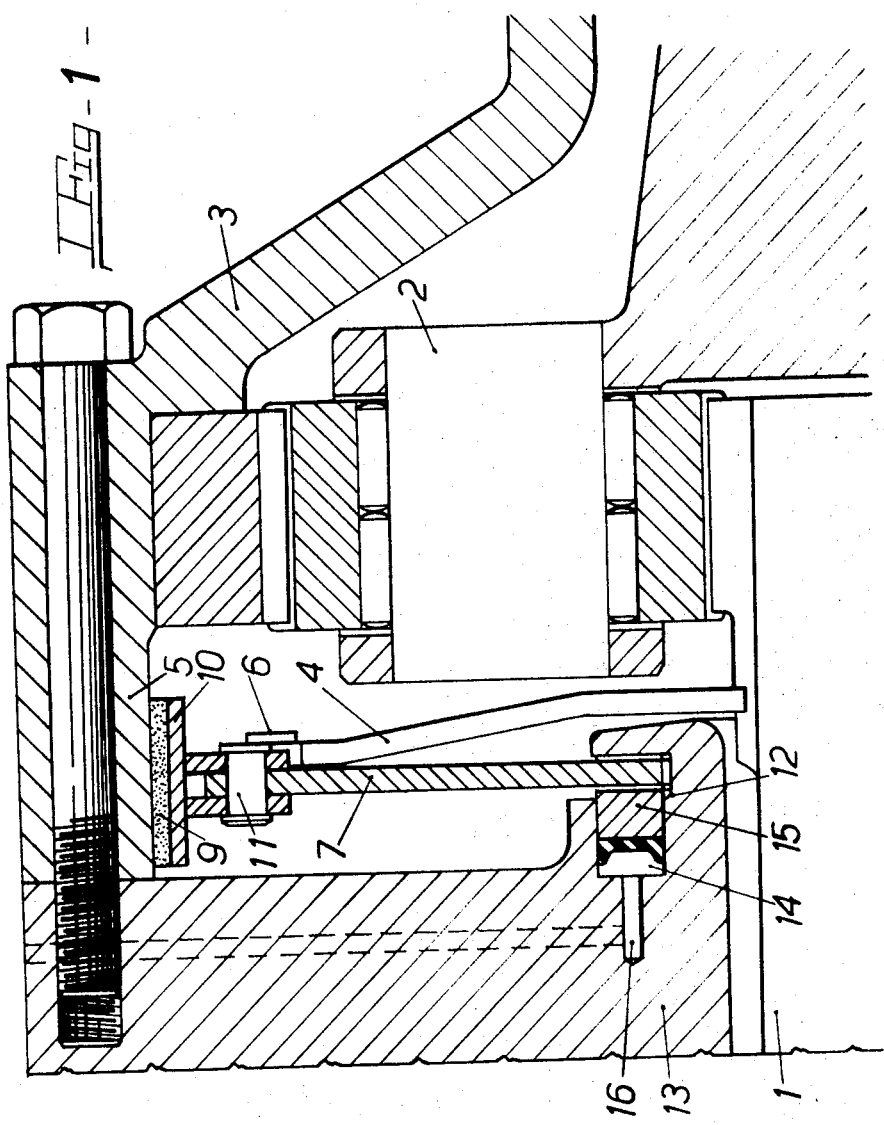
FIG. 1 is a section of one form of brake in a plane parallel to the axis of the transmission shaft.
Figure 2:
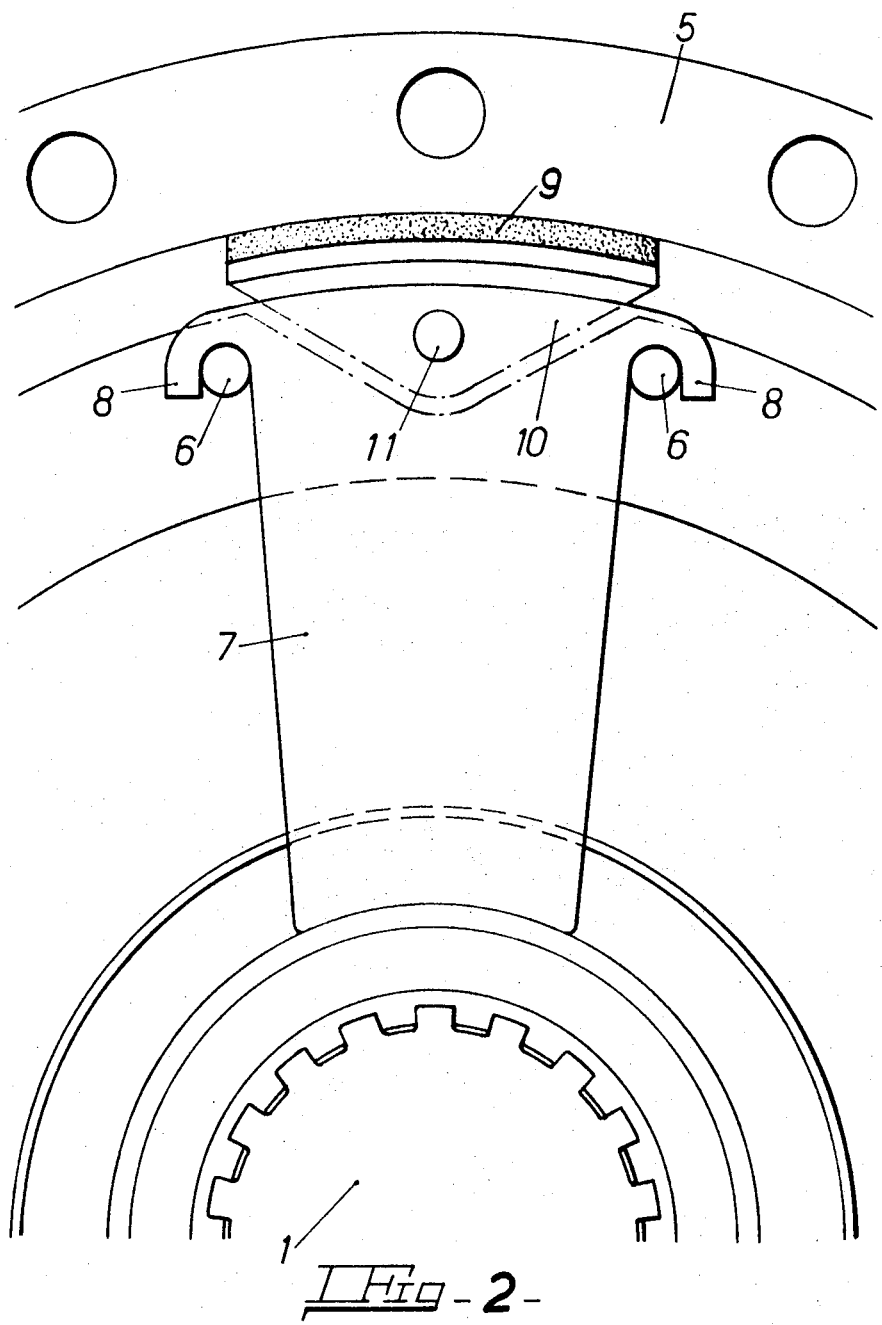
FIG. 2 is a section in a plane at right angles to that of FIG. 1.

In the embodiment shown in FIGS. 1 and 2 the brake system is arranged to brake the transmission shaft 1 of a tractor between an epicyclic reduction gear 2 and the main gear-box, the brake being located within the transmission casing 3. A carrier member in the form of a disc 4 is keyed on the transmission shaft at a point beyond the gears, and extends radially to a point spaced from the inner cylincrical surface of a projecting flange 5 of the casing. Two angularly spaced pins 6 support a radial lever 7 for rocking movement about either pin which are engaged under hooked lugs 8 on opposite sides of the lever. A friction pad 9 for engagement with the inner surface of the flange 5 is carried by a shoe 10 mounted for angular movement about a pin 11 on the centre line of the lever adjacent to its outer end. The friction pad has an arcuate surface of the same radius as the flange 5 which acts as a large stationary brake drum, the friction pad and the drum forming a first pair of friction elements.

The inner end of the lever 7 is received in an annular outwardly directed channel 12 co-axial with the shaft 1 and formed in a cover 13 bolted to the transmission casing.

An annular cylinder 14 is formed in the cover 13 and opens into the channel 12. An annular piston 15 works in this cylinder to clamp the inner end of the lever 7 when the piston is actuated by hydraulic fluid under pressure forced into the cylinder through a passage 16. The piston may be lightly spring-loaded to take up all clearances.

The channel 12 and the inner end of the lever 7 form a second pair of friction elements and the lever is the force-transmitting means between the two pairs of elements.

When the annular piston is actuated the rotation of the inner end of the lever 7 with the carrier is retarded so that the outer end of the lever is caused to rock about one or other of the pins 6 whereby the friction pad 9 carried by the shoe 10 is brought into engagement with the stationary flange 5. Thus the brake works in exactly the same way in whichever direction the shaft 1 is rotating and the lever is inherently damped.

Only a single lever and brake shoe are illustrated but it will be appreciated that a plurality of levers and brake shoes may be disposed at angular spacings around the circumference of the carrier disc to increase the torque capacity of the brake unit.

In a modification the shoe 10 may be pivoted on the carrier disc and be actuated by a cam surface on the outer end of the lever.

Many of the details may be varied. For example, the annular piston and cylinder actuator could be replaced by a servo system using ramps, and balls and a mechanical actuating system may be added for a parking brake.

In FIGS. 3 and 4, pads 20, 21 of friction material have friction faces at right angles to each other for engagement with flat surfaces 22, 23 also at right angles to each other, these surfaces being parts of a member 24 of channel section. The pads are carried by blocks 25, 26 between which is a push-rod 27 having oppositely inclined shoulders 28, 29. When the pads 20, 21 are urged against the surface 22 by a plurality of pistons 30 working in hydraulic cylinders 31 they move longitudinally, and as the blocks carrying the pads ride up the shoulders 28 or 29 on the push-rod the blocks are urged apart to force the friction pad into engagement with the surfaces 22 and 23.

Longitudinal movement of the push-rod independently of the hydraulic primary application will also force the pads into engagement with the surfaces.

In the arrangement shown in FIGS. 5 and 6 shoes 33 of friction material co-operate with the peripheral surface of a drum 34 mounted on a rotatable shaft 35. The shoes are carried by segmental blocks 36 within a peripheral flange 37 on a stationary housing 38. The shoes are adapted to be urged in an axial direction into engagement with the radial surface of a flange 39 on the drum by push-rods 40 actuated by rocking levers 41 which in turn are actuated by push-rods 42 through a thrust plate 43 and a thrust bearing 44 by a piston 45 working in an axial hydraulic cylinder in the housing.

When the radial end faces of the shoes are brought into engagement with the flange 39 the primary drag force so produced tends to carry the shoes and blocks round with the drum and the reaction of the peripheral flange 37 of the housing on the outer corners of the blocks urges the blocks inwardly to force the shoes into engagement with the periphery of the drum.

In the arrangement shown in FIGS. 7 and 8 arcuate friction pads 50 are carried by segmental blocks 51 and are adapted to engage the inner surface of a peripheral flange 52 on a stationary housing 53. The blocks are of truncated wedge shape and their inner ends are received in part-circumferential recesses 54 in a hub 55 keyed on a rotatable shaft 56. The ends of the recesses are oppositely inclined as shown at 57 and 58.

Radial end faces on the friction pads are urged by an annular piston 59 working in an annular cylinder in the housing into engagement with a radial face 60 on a lip extending inwardly from the flange 52 on the housing. The primary drag force so produced forces the inner ends of the blocks against one or other of the inclined faces 57 or 58 on the hub and the blocks are forced outwardly to bring the peripheral faces of the pads into engagement with the inner surface of the flange on the housing.

In the arrangement shown in FIGS. 9 and 10 blocks 65 of friction material having inner faces of shallow wedge outline are located in angularly spaced recesses of complementary outline in the periphery of a carrier 66 rotating within a stationary drum. Each recess presents two abutment surfaces 67 and 68 inclined in opposite directions at a small angle to each other.

Each block is located between the outwardly cranked ends 69 and 70 of strips 71 and 72 slidable with friction in sleeves on the outer ends of spring members 73 and 74. These extend through slots 75 and 76 in the carrier, the circumferential length of the slots being slightly greater than the thickness of the spring members. The spring members are preloaded towards each other and normally lie against the adjacent ends of the slots.

Centrifugal force urges the block outwardly against the drum and the resultant light drag causes the pad to rest against the end 69 of the strip 71 as shown in the drawing when the carrier is rotating in the direction indicated by the arrow.

The end of the pad may be inclined as shown so that contact with the strip tends to oppose the effect of centrifugal force.

To apply the brake the blocks are moved axially into engagement with a radial surface in the drum by an annular piston 77.

The increased drag on each block urges it against the strip 71, overcoming the resistance of the spring 73 and forcing the spring against the circumferentially outer end of the slot 75. The strip then slides through the sleeve on the spring and the block comes into engagement with the inclined surface 67 on the carrier by which it is forced outwardly into engagement with the drum.

On release of the brake the block 65 is returned with the strip 71 by the spring 73 returning to the circumferentially inner end of the slot 75, and a clearance 78 is re-established between the block and the carrier.

With the carrier rotating in the reverse direction the same effect is produced by the strip 72 and the spring member 74.

In the modification of that arrangement shown in FIGS. 11 and 12 hysteresis in the operation of the brake is avoided by substituting oppositely inclined articulated struts 80, 81 for the abutments 67 and 68. The struts are held in engagement with abutments 82, 83 in the carrier by springs 84.

Self-energisation in the off condition of the brake is prevented by spring hooks 85 and 86. The inner ends of these are engaged in the carrier and their outer ends are gripped by a clip 87 which abuts the block 88 at 89. Movement of the block to take up wear causes the hooks to be pulled out of the clip. Inclination of the hooks relative to the centre of rotation causes the tension induced the hooks by the residual drag on the block to oppose the effect of centrifugal force on the block.

The primary friction pair is preferably arranged to be lightly clamped during the non-operative condition of the brake to provide a small residual drag. One advantageous effect of this is to reduce to a minimum the movement required in the brake actuator in applying the brake; a further advantage is that for each direction of rotation, the appropriate abutment is held in contact with or in close proximity to the common element, irrespective of the state of wear of the secondary friction elements. The secondary friction pair is, therefore, applied with minimum impact.

In the rotational embodiments, this latter effect can be produced without clamping the primary friction pair by arranging the latter for axial movement and the secondary pair for radial movement. The centrifugal force thus acting on the secondary pair produces a drag on the latter to maintain the appropriate abutments in contact or close proximity as before.

When one element of one or both friction pairs has poor thermal conductivity, it is desirable that the thermally conducting element of the or each pair should form part of a large thermal conducting mass which may conveniently be a structural member of a vehicle, such as the bell housing of a tractor gear-box for example.

Thus, the inner peripheral surface of such a housing may be used as one element of either or both friction pairs.

I claim:

1. A self-servo brake for a rotating member comprising a carrier rotatable with the rating member, a first pair of friction elements for providing the main braking effort, one element being on the carrier and the other being stationary, and a second pair of friction elements subject to a control force, one element of the second pair being stationary and the other being on means mounted on the carrier for transmitting the drag force experienced by the second pair of friction elements to the first pair, and the second pair of friciion elements operating at a smaller effective radius from the axis of the rotating member than the first pair.

2. A self-servo brake as in claim 1 wherein the carrier is a disc keyed on a rotatable shaft, a radially disposed lever mounted to rock about angularly spaced pins on the disc adjacent to its periphery has pivoted to it a brake shoe adapted to engage a cylindrical surface on a stationary casing enclosing the brake, and the inner end of the lever is received in an annular channel coaxial with the shaft and formed in a part of the stationary casing carrying means for frictionally clamping the inner end of the lever in the channel, retardation of the inner end of the lever causing it to rock about one or other of the pins on the carrier and so urge the shoe into engagement with the cylindrical surface of the casing.

3. A self-servo brake as claimed in claim 2 wherein the means for frictionally clamping the inner end of the lever in the said annular channel comprises an annular piston working in an annular hydraulic cylinder opening into one side of the channel.

4. A self-servo brake as claimed in claim 3 wherein the disc carries a plurality of levers angularly spaced around it, each lever carrying a shoe for engagement with the cylindrical surface of the stationary casing.

5. A self-servo brake comprising primary and secondary pairs of co-operating friction elements of which one is common to both pairs and frictional engagement of one pair produces frictional engagement of the other pair, wherein the brake comprises a stationary housing of substantial mass, annular and radial surfaces in said housing respectively forming elements of the primary and secondary pairs, a friction pad forming the element common to both pairs, the friction surface of said pad which forms one of the secondary friction pair being of substantially smaller area than that of the surface in the housing with which it co-operates and the said pad forming part of an assembly mounted on and rotating with a shaft within the housing, fluid-pressure-operated means incorporated in the housing for urging said friction pad into engagement with said radial surface in the housing, and mutually inclined surfaces on said friction pad and another part of the assembly whereby on frictional engagement of the pad with the radial surface in the housing the pad is urged outwardly into engagement with the annular surface in the housing.

6. A brake as in claim 5 wherein means are incorporated for resiliently retaining the friction pad against radial movement under centrifugal force.

7. A brake as in claim 5 wherein the friction pad has inner faces of shallow wedge outline and is located in a recess of complementary outline on the periphery of a carrier mounted on and rotating with the shaft.

8. A brake as in claim 7 wherein the friction pad is located between circumferentially spaced strips slidable with friction in sleeves on resilient member passing through slots of limited length in the carrier, the strips being inclined in such a direction as to counteract the effect of centrifugal force on the pad and the strips returning the pads to the off position on release of the brake.

9. A brake as in claim 7 wherein the said recess incorporates struts with part-spherical ends about which the friction pad rocks when it is retarded by frictional engagement with the radial surface in the housing.

* * * * *